(12) United States Patent
Patel et al.

(10) Patent No.: US 8,494,120 B2  
(45) Date of Patent: Jul. 23, 2013

(54) DETECTING FOREIGN VOLTAGE FAULTS IN TELEPHONE CUSTOMER PREMISE EQUIPMENT

(75) Inventors: Dipak R. Patel, Hatboro, PA (US); Robert L. Kirkner, Chester Springs, PA (US); Scott A. Reinert, Telford, PA (US)

(73) Assignee: General Instrument Corporation, Horsham, PA (US)

( * ) Notice: Subject to any disclaimer, the term of this patent is extended or adjusted under 35 U.S.C. 154(b) by 768 days.

(21) Appl. No.: 12/620,960

(22) Filed: Nov. 18, 2009

(65) Prior Publication Data

US 2011/0116607 A1 May 19, 2011

(51) Int. Cl.
- *H04M 3/08* (2006.01)
- *H04Q 11/04* (2006.01)

(52) U.S. Cl.
USPC ............ 379/2; 324/72; 324/540; 361/42; 379/21; 379/27.05; 379/29.01; 379/156; 379/399.01

(58) Field of Classification Search
USPC .............. 324/72, 543; 361/42; 379/2, 21, 379/22.02, 22.03, 27.02, 27.06, 27.08, 29.01, 379/29.05, 29.09, 30, 93.05, 156, 399.01
See application file for complete search history.

(56) References Cited

U.S. PATENT DOCUMENTS

| | | | | |
|---|---|---|---|---|
| 4,459,437 A * | 7/1984 | Gabry et al. | ............. | 379/27.08 |
| 5,063,585 A * | 11/1991 | Shapiro | ............. | 379/30 |
| 5,073,919 A * | 12/1991 | Hagensick | ............. | 379/29.01 |
| 5,218,616 A * | 6/1993 | Stephens | ............. | 379/29.05 |
| 5,345,496 A * | 9/1994 | Galpin | ............. | 379/27.06 |
| 5,390,231 A * | 2/1995 | Hung et al. | ............. | 379/2 |
| 5,584,033 A * | 12/1996 | Barrett et al. | ............. | 710/105 |
| 5,625,667 A * | 4/1997 | Vogt et al. | ............. | 379/30 |
| 5,699,402 A * | 12/1997 | Bauer et al. | ............. | 379/29.09 |
| 5,742,671 A * | 4/1998 | Parkerson et al. | ............. | 379/156 |
| 5,774,316 A * | 6/1998 | McGary et al. | ............. | 361/42 |
| 5,802,151 A * | 9/1998 | Bevill et al. | ............. | 379/93.05 |
| 5,956,386 A * | 9/1999 | Miller | ............. | 379/27.02 |
| 6,058,161 A * | 5/2000 | Anderson et al. | ............. | 379/22.03 |
| 6,144,721 A * | 11/2000 | Stephens | ............. | 379/21 |
| 6,212,258 B1 * | 4/2001 | Bella et al. | ............. | 379/29.01 |
| 6,438,212 B1 * | 8/2002 | Lysaght et al. | ............. | 379/21 |
| 6,665,398 B1 * | 12/2003 | Ludeman | ............. | 379/399.01 |
| 6,969,928 B2 * | 11/2005 | Hanson | ............. | 307/328 |
| 7,116,760 B2 * | 10/2006 | Smith et al. | ............. | 379/22.02 |
| 7,719,253 B2 * | 5/2010 | Fitzpatrick et al. | ............. | 324/72 |
| 2011/0025343 A1 * | 2/2011 | Noessing et al. | ............. | 324/543 |
| 2011/0116607 A1 * | 5/2011 | Patel et al. | ............. | 379/2 |

* cited by examiner

*Primary Examiner* — Gerald Gauthier

(74) *Attorney, Agent, or Firm* — Stewart M. Wiener

(57) ABSTRACT

In general, in one aspect, the disclosure describes a digital network to telephone interface device having a controller capable of detecting foreign voltage faults without interrupting telephone service. Upon detection of a foreign voltage fault the controller can deactivate the telephone service and initiate a test sequence to confirm the foreign voltage fault. If the fault is confirmed the telephone service remains deactivated and an operator of the digital network is notified. The device will improve the quality of service and save the cost of sending some one to investigate the fault. The operator can take proactive action once the device provides fault analysis and information remotely.

19 Claims, 3 Drawing Sheets

DETECTING FOREIGN VOLTAGE FAULTS IN TELEPHONE CUSTOMER PREMISE EQUIPMENT

BACKGROUND

Cable television (CATV) operators provide television service as well other services including video-on-demand, Internet connectivity and telephone service to customers via digital CATV networks. Phone companies may also provide video and data services in addition to telephone services over a digital network. Customers premise equipment (CPE) may be utilized as an interface between the customer and the digital network. Problems with services provided by the digital network often require the customer to contact the provider to attempt to troubleshoot the problem. The provider may troubleshoot the problem remotely by performing various tests on the network and the CPE. The problems may be traced to problems with the CPE, such as being installed incorrectly or being faulty. In order to fix the problems associated with the CPE a technician may be dispatched, the customer may send the CPE in for repair, or the customer may exchange the faulty CPE for new CPE For telephone service, the CPE (Telco CPE) may provide the interface between the digital network and the analog phone service (digitize the analog phone service for transmission over the digital network, extract the analog phone service from a digital stream). A telephone may connect to the Telco CPE or the Telco CPE may utilize current phone wiring within the premise (customer phone network) to route the phone service provided by the digital network throughout the premise. The Telco CPE may connect to a phone jack in order to utilize the customer phone network. If the analog phone service (Plain Old Telephone Service (POTS)) is still active, the customer phone network may still be powered with a DC voltage. If the Telco CPE is connected to the phone jack prior to the analog phone service being deactivated, the power (DC voltage) provided to the customer phone network from the analog phone service may be provided to the Telco CPE. The power being provided to the Telco CPE may cause line faults and/or damage the Telco CPE.

FIG. 1 illustrates a high-level architecture for providing phone service over a digital network. A service provider 100 utilizes a digital network 110 to provide services to the customer. Telco CPE 120 is the interface between the digital network 110 and the customer with regard to phone service. The Telco CPE 120 may connect to the customer phone network 130 to route the telephone service to the phones 140 throughout the premise. If the customer phone network 130 is still connected to an active POTS line (has service with a POTS network), the customer phone network 130 will be powered and may damage the Telco CPE 120 when connected thereto.

Field failures of Telco CPE 120 caused by connecting the Telco CPE 120 to an active analog line is the reason for many field failures of Telco CPE 120. What is needed is a way to detect this condition and to protect the Telco CPE 120 from this condition prior to the Telco CPE 120 being damaged.

SUMMARY

An apparatus to provide an interface between a digital network and a telephone. The apparatus includes a telephone connector configured to receive a telephone cable providing a communication line to a telephone, a telephone interface coupled to the telephone connector and configured to provide an interface to the telephone, a digital network connector configured to receive a digital network cable providing communication to a digital network, a digital network interface coupled to the digital network connector and configured to provide an interface to the digital network, and a controller configured to monitor the telephone connector for a foreign voltage fault without interrupting telephone service. Upon detection of the foreign voltage fault, the controller is also configured to deactivate the communication line, initiate a test sequence to confirm the foreign voltage fault, and notify an operator of the digital network upon confirmation of the foreign voltage fault.

A digital network to telephone interface device including a telephone interface configured to provide an interface to a telephone, a digital network interface configured to provide an interface to a digital network, a processor, and a machine-readable storage medium storing computer executable instructions. When the instructions are executed by the processor they cause the processor to monitor the telephone interface for a foreign voltage fault without interrupting telephone service. Upon detection of the foreign voltage fault the instructions cause the processor to deactivate the telephone interface, initiate a test sequence to confirm the foreign voltage fault, and notify an operator of the digital network upon confirmation of the foreign voltage fault.

A method to locally check for foreign voltage faults in a digital network-telephone interface device. The method includes monitoring a telephone interface for a ground fault condition. At defined intervals, checking the telephone interface for a valid on-hook condition, instructing the telephone interface to measure loop currents upon detection of the valid on-hook condition, and comparing the measured loop currents to a threshold. Upon detection of the ground fault condition or exceeded loop currents, deactivating the telephone interface, initiating a test sequence to confirm the foreign voltage fault; and notifying an operator of the digital network upon confirmation of the foreign voltage fault.

BRIEF DESCRIPTION OF THE DRAWINGS

The features and advantages of the various embodiments will become apparent from the following detailed description in which.

DETAILED DESCRIPTION

Figure 1:
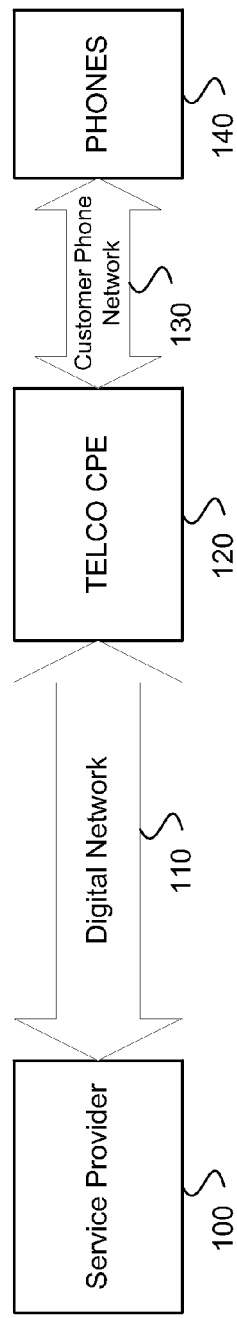
FIG. 1 illustrates a high-level architecture for providing phone service over a digital network.
Figure 2:
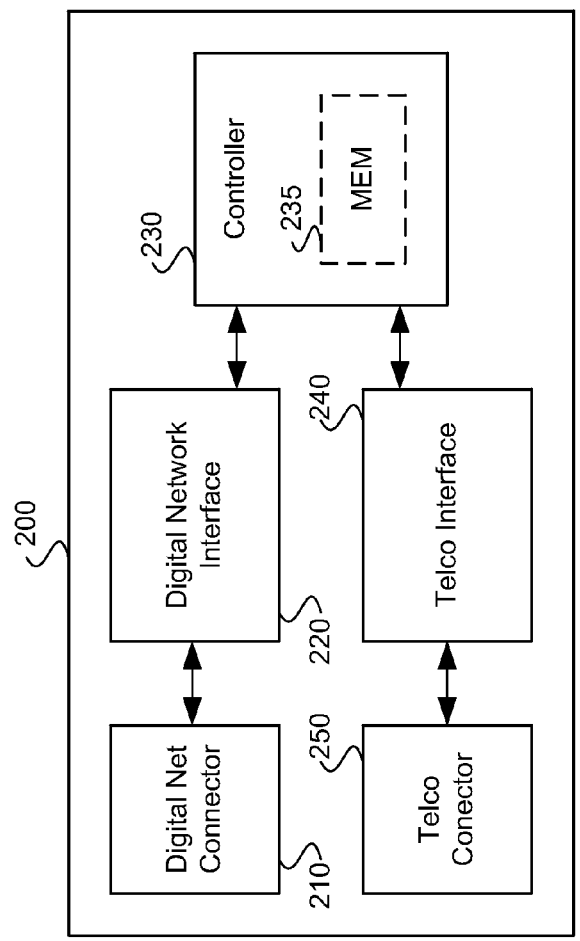
FIG. 2 illustrates a box diagram of an example Telco CPE, according to one embodiment.

FIG. 2 illustrates a box diagram of an example Telco CPE 200. The Telco CPE 200 may include a digital network connector 210, a digital network interface 220, a controller 230, a Telco interface 240, and a Telco connector 250. The digital network connector 210 is to receive a cable providing the connection to the digital network. The digital network may be a cable television (CATV) network transmitting RF signals or may be a telephonic network transmitting optical signals. The digital network connector 210 may be an RF connector or an optical connector. The digital network connector 210 may be mounted to or be in communication with the digital network interface 220 that provides the communications link between the Telco CPE 200 and the digital network.

The controller 230 may control the operation of the Telco CPE 200. The controller 230 may be a processor that is in communication with a machine-readable storage medium 235 storing computer executable instructions. The machine readable storage medium 235 is illustrated as being located on the controller 230 but is not limited thereto. Rather, the machine readable storage medium 235 may be located remote from the controller 230. The machine readable storage medium 235 may be, for example, RAM, ROM, Flash, a hard drive, a CD, a DVD, semiconductor memory or combinations thereof. The computer executable instructions may operate the controller 235 when executed by the controller 235.

The Telco interface 240 may provide the communications link between the Telco CPE 200 and the phone. The Telco connector 250 may be mounted to or be in communication with the Telco interface 240 and is to receive a cable providing the connection to the phone, either directly or via the phone wiring within the premise (customer phone network). The Telco connector 250 may be, for example, an RJ-11 connector. The Telco connector 250 may include conductive pins (e.g., two pins often referred to as the Tip and Ring pins or Tip and Ring conductors) that receive signals transmitted over conductive wires (e.g., two wires often referred to as the Tip and Ring wires) within the telephone cable. For ease of illustration, neither the conductive pins within the Telco connector 250 or the telephone cable or conductive wires contained therewithin are illustrated.

The operator of the digital network may initiate tests on the Telco CPE 200 at defined intervals, or when a customer reports problems, in order to perform diagnostics. The tests initiated by the operator may temporarily take the line out of service and may detect faults in the Telco CPE 200. For example, a test may determine if there is a fault caused by the Telco connector 250 being shorted or having power from an external source (e.g., from an active POTS line) being applied thereto. When a fault is detected, the operator may contact the customer or dispatch a technician to attempt to correct the fault (e.g., remove the connection to the active POTS line). The operator may deactivate the line until the fault can be corrected. The line may remain deactivated until the operator confirms that the fault has been corrected. Furthermore, by the time the fault is detected the fault may have damaged the Telco CPE 200 and require replacement thereof.

Rather then rely on the operator to initiate tests on the Telco CPE 200, the controller 230 may have the Telco CPE 200 perform a sequence of tests to detect a fault, determine the type of fault and take necessary action (remove the line from service). According to one embodiment, computer implemented instructions may stored in the machine readable storage medium 235 and when executed by the controller the computer implemented instructions may cause the controller to perform a sequence of tests to detect a fault, determine the type of fault and take necessary action.

The sequence of tests can be configured to have minimal service impact (minimal down time). The sequence of tests may be utilized to detect when a voltage from a foreign telephone service (e.g., analog phone service) is being applied to the Telco CPE 200 such as would happen the customer phone network was still connected to an active analog phone line (still had POTS service). The controller 230 may deactivate the line (remove the line from service) when a voltage from a foreign telephone service is detected and notify the operator of the failure. A portion of the sequence of tests may continue to be performed when the line is deactivated and if the fault is removed the controller 230 may reactivate the line (return the line to service).

The tests may include a ground fault test that is utilized to detect a ground fault associated with a short on any of the conductive pins within the Telco connector 250 (e.g., Tip conductor pin to ground, Ring conductor pin to ground). The Telco interface 240 may have a ground fault detection test already implemented therein. The ground fault test may be a passive test that does not interfere with the operation of the line. The ground fault test of the Telco interface 240 may measure longitudinal currents between the conductors (e.g., Tip and Ring) in the Telco connector 250. The scaled longitudinal drive current measured may be compared to a threshold to determine if there is a ground fault. A short between either conductor (e.g., Tip, Ring) and ground may reduce the resistance therebetween enough to cause the longitudinal current to exceed the threshold.

In addition to a short causing the longitudinal current to exceed the threshold and indicate a ground fault, some instances of a foreign voltage being applied to the Telco connector 250 may be the same. The polarity of the voltage applied across the conductors (e.g., Tip and Ring) may determine whether the longitudinal current is increased past the threshold. When a fault is detected the Telco interface 240 may indicate the fault in some fashion (e.g., set a bit in a register, issue an interrupt). The ground fault test may not be able to determine whether the fault was caused by a short or a foreign voltage. Accordingly, when a ground fault is detected additional testing should be performed to determine the cause of the fault. The controller 230 may monitor the Telco interface 240 for the indication (e.g., bit set in register) a ground fault exists and take action based thereon. Alternatively, the Telco interface 240 may be modified to act on the detection of a ground fault (e.g., notify the controller 230).

Since the ground fault test may only detect a foreign voltage in some instances (based on the polarity of the voltage), a loop current test may be performed as well to detect when current is flowing between the conductors (e.g., Tip and Ring). The flow of current between conductors may indicate that the Telco connector 250 is connected to a foreign voltage source. The loop current test may be periodically run to measure the metallic current (current flowing between the Tip and the Ring, the loop current) of the Telco connector 250. The loop current measured may be stored in a register and then compared to the threshold. The measurement may be limited to when an on-hook condition is detected (when the telephone is on the hook and presumably not being utilized) so as not to interfere with service.

Ideally there would be no current flowing between the conductors (e.g., Tip and Ring), however if there is some type of resistance therebetween some current may flow. Accordingly, the current flow test may determine if the current flow is above some threshold current. When the loop current measured is above the threshold it may be an indication that the Telco connector 250 is connected to a foreign voltage source. The threshold may be set high enough so that a false indication of a foreign voltage source connection is not made. For example, a resistance of approximately 200 KΩ between the conductors (e.g., Tip and Ring) may result in approximately 200 µA of current to flow therebetween. If a POTS line was connected to the Telco connector 250 a current of approximately 600 µA may be expected. Accordingly, if the threshold was set at approximately 400 µA a determination that the loop current was above this threshold would presumably be a valid determination that the Telco connector 250 was connected to a foreign voltage source (POTS line). The threshold value may be a configurable value. The value may be programmed into the Telco CPE 200 (e.g., the computer readable storage medium 235) based on the type of installation. The value may be modified by a technician during installation or may be modified remotely by an operator.

If either of the first two above noted tests indicates a fault, a third test may be included that may determine the exact cause of the fault (e.g., if the fault is caused from a foreign voltage or resistive short). This test may be a full line test suite such as the test suite that may typically be initiated by an operator of the digital network (e.g., when a customer reports a failure). This test may take the line out of service during the running of the test. If the test confirms that there is a fault the line may remain out of service and the Telco CPE 200 may notify the operator of the fault. The test may be run periodically after the line is deactivated and if the fault is removed (e.g., POTS line is deactivated, connection is removed) the line may be reactivated.

Figure 3:
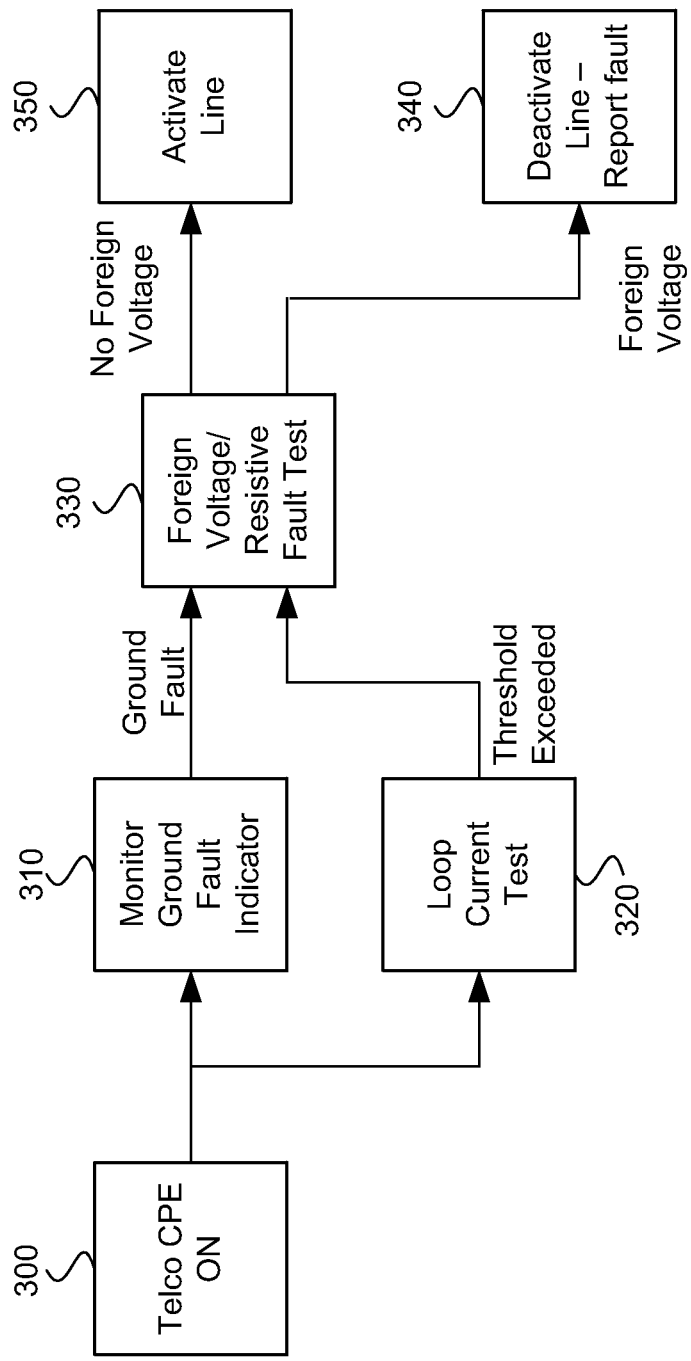
FIG. 3 illustrates an example high-level process flow for the Telco CPE to monitor for the presence of a voltage from a foreign telephone service, according to one embodiment.

FIG. 3 illustrates an example high-level process flow for the Telco CPE to monitor for the presence of a voltage from a foreign telephone service. The process may be performed by the controller. Initially the Telco CPE is powered on 300. Monitoring for an indication that a ground fault has occurred in the Telco connector may continuously be performed 310. The monitoring may be performed by the controller and may include monitoring a ground fault bit in a register within the Telco interface to detect when a bit corresponding to a ground fault is activated. Alternatively, the Telco interface may inform the controller when a ground fault occurs. When a ground fault is detected, the controller may initiate further testing.

At defined intervals, the Telco interface may measure the loop current of the Telco connector. The measurement intervals may be defined by the controller and the controller may instruct the Telco interface to perform the measurements. The measured loop current may be compared to a threshold value 320. The comparison of the measured value to the threshold may be performed by the controller (or alternatively by the Telco interface). If the threshold is exceeded, the controller may initiate further testing. The Telco interface may confirm that there is an on-hook condition prior to performing the loop current test. The controller may instruct the Telco interface to check the on-hook condition.

If the monitoring 310 detects a ground fault or the loop current test 320 determines that a threshold current is exceeded, the controller may initiate a test suite (foreign voltage/resistive fault test) 330. This test 330 may determine the exact type of fault that exists in the Telco connector. When the test 330 is being performed, the line will be deactivated (e.g., the controller may put the Telco connector in a high impedance state). If the test 330 determines that the fault is due to a foreign voltage being applied (connected to an active POTS line) the line will be deactivated by, for example, by placing the line in a high impedance disconnect state 340. When the line is deactivated, the controller may also notify the operator of the fault. If the test determines that there is no foreign voltage the line may be activated 350. It should be noted, that if the test determines that a foreign voltage is present the test may be rerun at some defined interval. During the rerunning of the test, if a determination is made that the foreign voltage is no longer present the line may be reactivated.

Figure 4:
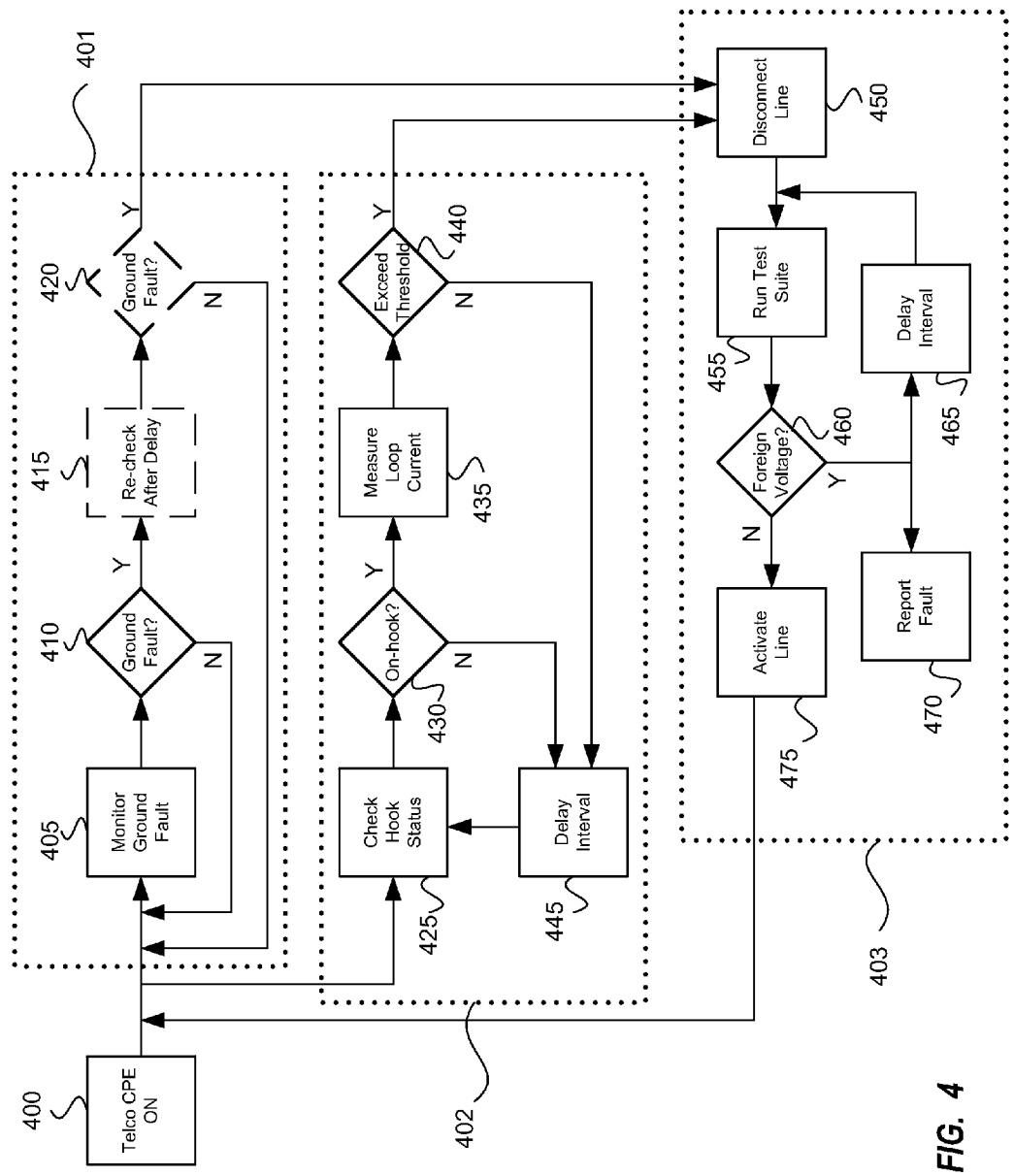
FIG. 4 illustrates an example detailed process flow for the Telco CPE to monitor for the presence of a voltage from a foreign telephone service, according to one embodiment.

FIG. 4 illustrates an example detailed process flow for the Telco CPE to monitor for the presence of a voltage from a foreign telephone service. Initially the Telco CPE is powered on and the line is activated 400. After the Telco CPE is powered on and the line is activated, the controller may initiate the process by performing passive tests that do not effect the line status. The first test may be to continuously monitor the line for ground fault indications 401. The second test may be to periodically check the loop current for an indication that there is a connection to an active POTS line 402. If either of these tests fails, a fault verification test suite may be initiated that requires the line to be deactivated 403.

The first test 401 may begin by monitoring the line for a ground fault 405. This may include monitoring the status of a ground fault bit within a register in the Telco interface. The Telco interface may monitor the line and set a ground fault bit when a ground fault it determines a ground fault is present and the controller may monitor the ground fault bit. Alternatively, the Telco interface may record longitudinal currents measured for the connector and the controller may monitor the longitudinal currents recorded in the register. A determination is then made, as to whether there is a ground fault on the line 410. If there was not a ground fault (410 No), then the monitoring 405 is continued. If there was a ground fault detected (410 Yes) then the line may be disconnected 450. In order to ensure that the ground fault was accurately detected the ground fault may be checked again after some delay 415. The delay may be implemented by the controller or alternatively may be implemented by the Telco interface. A determination is then made as to whether the ground fault still exists 420 (e.g., whether the ground fault bit is still set). If the ground fault is no longer present (420 No), then the monitoring 405 is continued. If the ground fault is still detected (420 Yes), then the fault verification test may be initiated 403.

The second test 402 may begin by checking an on-hook condition of the line 425. An on-hook condition indicates that the customer is not utilizing the line and testing can be performed with interrupting service. The Telco interface may determine when the line has a valid an on-hook condition and may set a valid on-hook bit in a register and the controller may monitor the on-hook bit. Alternatively, the Telco interface may record loop currents and/or voltages measured for the connector and the controller may monitor the voltages and/or loop currents recorded in the register. The controller may instruct the Telco interface to make the on-hook determination or to measure and record the voltages and/or loop currents necessary to make an on-hook determination. A determination is then made, as to whether the line has an on-hook condition 430. If the line does not have a valid on-hook condition (430 No), then a delay interval is initiated 445 before the on-hook status is again checked 425. The delay interval may be a period of time between test intervals (e.g., 60 seconds). The delay interval may be set by initiating a counter. The delay may be implemented by the controller (or alternatively may be implemented by the Telco interface). If the line has a valid on-hook status (430 No), then the loop current is measured 435. The loop current may be measured by the Telco interface and stored in a register. The Telco interface may make the measurements when instructed by the controller. A determination is then made as to whether the loop current measured exceeds some threshold 440. The determination may be made by the controller (or alternatively by the Telco interface). If it is determined that the loop current does not exceed the threshold (440 No), then the delay interval is initiated 445 before the on-hook status is again checked 425. If it is determined that the loop current exceeds the threshold (440 Yes), then the fault verification test may be initiated 403.

The fault verification test 403 may begin by disconnecting the line from service (deactivating the line) 450. After the line is disconnected, the controller may initiate a test suite to determine if a fault exists and if a fault exists what type of fault it is 455. A determination is made as to whether a foreign voltage fault occurred 460. If a foreign voltage fault occurred (460 Yes), the line may remain deactivated and the controller may communicate the fault to a network operator 470. After a delay interval 465, the test suite may be rerun 455. The delay interval may be set by initiating a counter. The delay may be implemented by the controller (or alternatively by the Telco interface). The delay may be a configurable/programmable value. If there is no foreign voltage fault (460 No), the line may be reactivated 475. By retesting the Telco CPE at defined intervals after a foreign voltage fault is found, it enables the Telco CPE to be put back in operation if the fault is corrected. For example, if the customer removes the Telco CPE from an active POTS line after the line is deactivated the line may be reactivated.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An apparatus to provide an interface between a digital network and a telephone, the apparatus comprising:
    a telephone connector configured to receive a telephone cable providing a communication line to a telephone;
    a telephone interface coupled to the telephone connector and configured to provide an interface to the telephone;
    a digital network connector configured to receive a digital network cable providing communication to a digital network;
    a digital network interface coupled to the digital network connector and configured to provide an interface to the digital network; and
    a controller configured to
        monitor the telephone connector for a foreign voltage fault without interrupting telephone service, and
        upon detection of the foreign voltage fault
            deactivate the communication line,
            initiate a test sequence to confirm the foreign voltage fault, and
            notify an operator of the digital network upon confirmation of the foreign voltage fault,
    wherein the controller is configured to deactivate the communication line by placing the telephone connector in a high impedance state.

2. The apparatus of claim 1, wherein the controller is further configured to
    re-initiate the test sequence after a predefined period of time after the confirmation of the foreign voltage fault, and
    reactivate the communication line in response to the test sequence determining the foreign voltage fault has been cleared.

3. The apparatus of claim 1, wherein the telephone interface is configured to
    monitor longitudinal current of the telephone connector, compare the longitudinal current to a threshold, and activate a ground fault bit if the threshold is exceeded.

4. The apparatus of claim 3, wherein the controller is configured to monitor the telephone connector for the foreign voltage fault by monitoring the ground fault bit in the telephone interface.

5. The apparatus of claim 1, wherein the telephone interface is configured to
    determine hook status of the communication line; and
    when the communication line has an on-hook status, measure loop current of the telephone connector.

6. The apparatus of claim 5, wherein the controller is configured to monitor the telephone connector for the foreign voltage fault by
    checking the telephone interface for an indication the communication line has the on-hook status;
    obtaining the loop current measurements when the communication line has the on-hook status; and
    determining if the loop current exceeds a predefined threshold.

7. The apparatus of claim 6, wherein the telephone interface is configured to record the hook status in a register and the controller is configured to check the register for the indication the communication line has the on-hook status.

8. The apparatus of claim 6, wherein the controller is further configured to instruct the telephone interface to measure the loop current.

9. The apparatus of claim 6, wherein the controller is further configured to
    initiate a delay period if the communication line has an off-hook condition or the loop current does not exceed the predefined threshold; and
    after the delay period has expired, restarting the checking for the on-hook status and the determining if the loop current exceeds the predefined threshold.

10. The apparatus of claim 1, wherein the digital network is a digital cable network and the digital network interface is an RF interface.

11. The apparatus of claim 1, wherein the digital network is a digital telephone network and the digital network interface is an optical interface.

12. A digital network to telephone interface device comprising
    a telephone interface configured to provide an interface to a telephone;
    a digital network interface configured to provide an interface to a digital network;
    a processor; and
    machine-readable storage medium storing computer executable instructions, which, when executed by the processor causes the processor to
        monitor the telephone interface for a foreign voltage fault without interrupting telephone service, and
        upon detection of the foreign voltage fault
            deactivate telephone interface;
            initiate a test sequence to confirm the foreign voltage fault, and
            notify an operator of the digital network upon confirmation of the foreign voltage fault.

13. The device of claim 12, wherein when executed the computer executable instructions further cause the processor to
    re-initiate the test sequence after a predefined period of time after the confirmation of the foreign voltage fault, and
    reactivate the telephone interface in response to the test sequence determining the foreign voltage fault has been cleared.

14. The device of claim 12, wherein when executed the computer executable instructions cause the processor to monitor the telephone interface for the foreign voltage fault by monitoring a ground fault bit in the telephone interface.

15. The device of claim 12, wherein when executed the computer executable instructions cause the processor to monitor the telephone interface for the foreign voltage fault by
- checking the telephone interface for a valid on-hook condition;
- instructing the telephone interface to measure loop currents when the valid on-hook condition exits;
- obtaining loop current measurements for the telephone interface; and
- determining if the loop current measurements exceed a predefined threshold.

16. The device of claim 15, wherein when executed the computer executable instructions further cause the processor to monitor the telephone interface for the foreign voltage fault by
- initiating a delay period if there is an off-hook condition or the loop current measurements do not exceed the predefined threshold; and
- after the delay period has expired, repeating the checking, the instructing, the obtaining and the determining.

17. A method to locally check for foreign voltage faults in a digital network-telephone interface device, the method comprising
- monitoring a telephone interface for a ground fault condition;
- at defined intervals,
  - checking the telephone interface for a valid on-hook condition;
  - instructing the telephone interface to measure loop currents upon detection of the valid on-hook condition; and
  - comparing the measured loop currents to a threshold; and
- upon detection of the ground fault condition or exceeded loop currents:
  - deactivating the telephone interface;
  - initiating a test sequence to confirm the foreign voltage fault; and
  - notifying an operator of the digital network upon confirmation of the foreign voltage fault.

18. The method of claim 17, further comprising
- re-initiating the test sequence after a predefined period of time after the confirmation of the foreign voltage fault, and
- reactivating the telephone interface in response to the test sequence determining the foreign voltage fault has been cleared.

19. The method of claim 17, further comprising configuring the defined interval and the threshold.

* * * * *